3,812,091
D-ANALOGS OF SECRETIN
Miguel A. Ondetti, North Brunswick, N.J., assignor to
E. R. Squibb & Sons, Inc., Princeton, N.J.
No Drawing. Continuation-in-part of abandoned application Ser. No. 811,259, Mar. 27, 1969. This application May 25, 1972, Ser. No. 256,952
Int. Cl. C07c 103/52; C07g 7/00
U.S. Cl. 260—112.5      2 Claims

ABSTRACT OF THE DISCLOSURE

Analogs of the gastrointestinal hormone secretin wherein the 1-His and optionally the 2-Ser, 6-Phe, 12-Arg, 14-Arg, 18-Arg, or 21-Arg is replaced by the corresponding D-amino acid possess secretin-like activity and are useful as antacids in hyperacidic conditions of the stomach and duodenum. The compounds of the invention are resistant to enzymes which degrade secretin.

RELATED APPLICATION

This application is a continuation-in-part of copending application Ser. No. 811,259, filed Mar. 27, 1969, now abandoned.

This invention relates to D-analogs of the peptide secretin, salts and intermediates thereof. Porcine secretin has the formula:

His-Ser-Asp-Gly-Thr-Phe-Thr-Ser-Glu-Leu-Ser-Arg-Leu-Arg-Asp-Ser-
1   2   3   4   5   6   7   8   9   10  11  12  13  14  15  16

Ala-Arg-Leu-Glu-(NH$_2$)-Arg-Leu-Leu-Glu-(NH$_2$)-Gly-Leu-Val-NH$_2$
17  18  19  20       21  22  23  24        25  26  27 and hence it is a peptide containing 27 amino acid residues containing the amino acids: L-histidine (His); L-aspartic acid (Asp); L-serine (Ser); glycine (Gly); L-threonine (Thr); L-phenylalanine (Phe); L-glutamic acid (Glu); L-glutamine [Glu(NH$_2$)]; L-leucine (Leu); L-arginine (Arg); L-alanine (Ala); and L-valinamide (Val-NH$_2$).

In accordance with this invention the novel compounds have the general formula:

D-His-R-Ser-Asp-Gly-Thr-R-Phe-Thr-Ser-Glu-Leu-Ser-R-Arg-Leu-R-
1   2   3   4   5   6   7   8   9   10  11  12  13

Arg-Asp-Ser-Ala-R-Arg-Leu-Glu(NH$_2$)-R-Arg-Leu-Leu-Glu(NH$_2$)-Gly-
14  15  16  17  18  19  20        21  22  23  24        25

Leu-Val-NH$_2$
26  27 wherein R is L or D.

The D-forms of secretin and salts thereof can be prepared synthetically by synthesizing novel intermediates and combining them until the D-analogs of secretin are formed.

In accordance with the present invention, D-secretin may be prepared synthetically beginning with L-valinamide and adding the remaining amino acids, one at a time or in groups, to form the peptide. Such addition may be accomplished by protecting the amino group in such amino acid, e.g., by converting it to its benzyloxycarbonyl derivative, activating the carboxylic acid group in the amino acid to be added, e.g., by converting it to its nitrophenyl ester derivative, and then interacting the amino acid with a previously prepared peptide in the chain, after removing the protecting group originally present in the peptide.

The D-secretin analogs of the invention may also be prepared by condensing peptide sequences. Such sequences which may be utilized in the practice of this invention are:

D-His-R-Ser-Asp-Gly-($S_{1-4}$);
 1    2   3   4

Thr-R-Phe-Thr-Ser-($S_{5-8}$);
 5   6   7   8

Glu-Leu-Ser-R-Arg-Leu-($S_{9-13}$);
 9   10  11  12  13 and

R-Arg-Asp-Ser-Ala-R-Arg-Leu-Glu(NH$_2$)-R-Arg-Leu-Leu-Glu(NH$_2$)-
14  15  16  17  18  19  20              21  22  23  24

Gly-Leu-Val-NH$_2$($S_{14-27}$)
25  26  27 wherein R is as defined herein.

The following equations are illustrative of the invention utilizing the procedures outlined above:

$$S_{9-13} + S_{14-27} \rightarrow S_{9-27} \quad S_{9-27} + S_{5-8} \rightarrow S_{5-27} \rightarrow S_{5-27} + S_{1-4} \rightarrow S_{1-27}$$

The compounds of the invention are biologically active materials which possess the same qualitative activity as secretin. The fact that the D-analogs of secretin of the present invention have such activity is surprising since it is known that minor deviations from the structure of secretin result in essentially complete loss of activity. For example, the 3-β-aspartic acid analog of secretin and 1-deshistidine secretin are essentially inactive.

In preparing the compounds of the present invention the N-terminal amino group may be protected with any suitable amino protecting group. The selection of which amino protecting group to employ will be made by those skilled in the art in accordance with such factors as, e.g., the nature of the amino acid or peptide which is to be attached to the free N-terminal group of the starting amino acid or peptide, the ease of removal of the protecting group, reaction solvent, temperature, etc. Some commonly used amino protecting groups are the following:

(1) amine hydrochlorides
(2) the p-toluenesulfonyl group
(3) the benzyloxycarbonyl (carbobenzoxy) group
(4) substituted benzyloxycarbonyl and other urethane protecting groups
(5) the trifluoroacetyl group
(6) the phthalyl (or phthaloyl) group
(7) the diphenylmethyl (benzhydryl) and triphenylmethyl (trityl) groups
(8) the formyl group
(9) lactams
(10) Schiff bases and enamines
(11) the benzylsulfonyl group
(12) tritylsulfenyl and arylsulfenyl.

Some specific protecting groups are tert.-butyloxycarbonyl, o-nitrophenylsulfenyl, and tosyl. A more complete works on peptide synthesis, e.g., Bodanszky et al., "Peptide Synthesis," Chapter 4, Interscience, 1966, or Schröder et al., "The Peptides," Vol. I, pp. xxiii–xxix, Academic Press, 1965.

Similarly, in preparing the compounds of the present invention, the C-terminal carboxyl group may be protected with any suitable carboxyl protecting group. The selection of which carboxyl protecting group to employ will be made by those skilled in the art in accordance with such factors as, e.g., the nature of the peptide being synthesized, ease of removal of the protecting group, reaction solvent, temperature, etc.

Some commonly used carboxyl protecting groups are the following:

(1) salt formation
(2) lower alkyl esters
(3) phenyl substituted lower alkyl esters, e.g., benzyl and benzhydryl esters
(4) p-nitrobenzyl esters
(5) p-methoxybenzyl esters
(6) pthalimidomethyl esters
(7) tertiarybutyl esters
(8) cyclopentyl esters
(9) methylthioethyl esters
(10) trimethylsilyl group
(11) hydrazides.

Some specific carboxyl protecting groups are methyl, ethyl, propyl, tert.-butyl, and benzyl. A more complete listing may be obtained by reference to standard works on pipetide synthesis, e.g., Bodanszky et al., supra, or Schröder et al., supra.

Similarly, hydroxyl groups and guanidino groups may be protected by protecting groups whose selection will be based on criteria obvious to those skilled in the art.

Examples of suitable hydroxyl protecting groups are, for example, benzyl, t-butyl, and tetrahydropyranyl. Examples of suitable guanidine protecting groups are, for example, nitro, tosyl, p-nitrobenzyloxycarbonyl, adamantyloxycarbonyl, and protonation. A more complete listing of hydroxyl and guanidine protecting groups may be had by reference to standard works on peptide synthesis, for example, the previously mentioned Bodanszky et al., or Schröder et al. texts.

The compounds of the present invention are more resistant than secretin to enzymes which degrade secretin. For example, the D-analogs of secretin of the present invention are not degraded when treated with dipeptidyl aminopeptidase at the same conditions under which this material extensively degrades secretin.

The compounds of the present invention are effective antacids by virtue of their ability to stimulate pancreatic output of bicarbonate radical and may also be used as a pancreatic diagnostic agent similarly to secretin. Commercially available secretin has a potency of one unit per mg. whereas the D-analogs of secretin of the present invention have a potency of 1,000 units per mg.

The following examples illustrate the present invention without, however, limiting the same thereto. All temperatures are expressed in degrees centigrade.

EXAMPLE 1

Benzyloxycarbonyl-D-phenylalanyl-L-threonyl-L-serine methyl ester

Palladium on charcoal (10%, 2.1 g.) is added to a solution of benzyloxycarbonyl-L-threonyl-L-serine methyl ester (21 g., 60 mmol.) in a mixture of absolute ethanol (200 ml.) and 1 N hydrochloric acid (60 ml.). The suspension is stirred under a hydrogen atmosphere for seven hours. The catalyst is filtered and the filtrate is concentrated in vacuo. The oily residue is dissolved in dimethylformamide (300 ml.) containing triethylamine (8.4 ml., 60 mmol.) and allowed to react with benzyloxycarbonyl-D-phenylalanine p-nitrophenyl ester (29 g., 72 mmol.). The mixture is stored at room temperature for six hours. The solvents are removed in vacuo, and the residue is digested with ethyl acetate. The crystalline solid is collected, dried, and recrystallized from methanol-water (2:1), yield: 16.5 g. (55%).

EXAMPLE 2

Benzyloxycarbonyl-L-threonyl-D-phenylalanyl-L-threonyl-L-serine methyl ester

To a solution of D-phenylalanyl-L-threonyl-L-serine methyl ester hydrochloride [prepared by hydrogenolysis of benzyloxycarbonyl - D - phenylalanyl - L - threonyl-L-serine methyl ester (15 g., 30 mmol.)] in dimethylformamide (100 ml.) containing triethylamine (5.04 ml., 36 mmol.) is added benzyloxycarbonyl-L-threonine 2,4 - dinitrophenyl ester (15 g., 36 mmol.). The mixture is kept at room temperature overnight. After removing the solvent in vacuo, the residue is digested with ethyl acetate. The crystalline solid is collected, dried and recrystallized from 95% ethanol, yield: 15.4 g.

EXAMPLE 3

Benzyloxycarbonyl-L-threonyl-D-phenylalanyl-L-threonyl-L-serine hydrazide

Hydrazine hydrate (1.7 ml.) is added to a solution of benzyloxycarbonyl-L-threonyl - D - phenylalanyl-L-threonyl-L-serine methyl ester (2.1 g., 3.5 mmol.) in methanol (170 ml.). The mixture is stored at room temperature for twenty hours, and the precipitate formed is collected by filtration, dried, and crystallized from methanol, yield: 1.56 g. (74%).

EXAMPLE 4 t-Butyloxycarbonyl nitro-D-arginyl-L-leucine benzyloxycarbonyl hydrazide t-Butyloxycarbonylnitro-D-arginine 2,4 - dinitro phenyl ester (7.15 g., 14.4 mmol.) is added to an ice-cold solution of L-leucine benzyloxycarbonylhydrazide trifluoroacetate (4.75 g., 12 mmol.) and triethylamine (1.68 ml., 12 mmol.) in tetrahydrofuran (24 ml.). Two more portions of the dinitrophenyl ester (0.7 g. each) are added at 1-hour intervals. The mixture is kept at room temperature overnight and then dimethylaminopropylamine (0.75 ml.) is added. After one hour, the reaction mixture is diluted with ethyl acetate (200 ml.) and the resulting solution is washed once with 20% citric acid, once with water, twice with 0.5 N ammonium hydrazide, and four times with water. The organic layer is dried (MgSO$_4$), and the solvents are evaporated in vacuo. The oily residue is triturated under ether until it becomes solid. The crude product is crystallized from an ethyl-acetate-ether mixture (1:9) 6.15 g. (88%).

EXAMPLE 5 t-Butyloxycarbonyl-O-benzyl-L-seryl nitro-D-arginyl-L-leucine benzyloxycarbonylhydrazide t-Butyloxycarbonylnitro-D-arginyl - L - leucine benzyloxycarbonylhydrazide (7 g., 12 mmol.) is dissolved in trifluoroacetic acid (25 ml.) maintained at 10° C. and the solution is kept at room temperature for 15 minutes. The trifluoroacetic acid is removed in vacuo at room temperature and the residue is triturated with ether. The solid is filtered, washed with ether, and dried in vacuo (KOH). This trifluoroacetate is dissolved in ice-cold dimethylformamide (36 ml.), neutralized with triethylamine (1.68 ml., 12 mmol.) and allowed to react with t-butyloxycarbonyl-O-benzyl-L-serine p-nitrophenyl ester (prepared from 4.4 g. (15 mmol.) of t-butyloxycarbonyl-O-benzyl-L-serine. After standing at room temperature, the reaction mixture is diluted with ethyl acetate (300 ml.) and washed once with 20% citric acid and twice with water. The organic phase is dried (MgSO$_4$) the solvent is removed in vacuo and the residue is crystallized from ethyl acetate, yield: 6.3 g. (70%).

EXAMPLE 6 t-Butyloxycarbonyl-L-leucyl-O-benzyl-L-seryl nitro-D-arginyl-L-leucine benzyloxycarbonylhydrazide Prepared in same manner as foregoing protected tripeptide. It is crystallized from absolute ethanol, yield: 82%.

EXAMPLE 7 t-Butyloxycarbonyl-α-benzyl-L-glutamyl - L - leucyl-O-benzyl-L-seryl-nitro-D-arginyl - L - leucine benzyloxycarbonylhydrazide Prepared in the same manner as foregoing tetrapeptide. It is crystallized from methanol, yield: 84%.

EXAMPLE 8

L-glutamyl-L-leucyl-L-seryl-D-arginyl - L - leucyl nitro-D-arginyl-β-benzyl-L-aspartyl - O - benzyl - L - seryl-L-alanylnitro-D-arginyl-L-leucyl - L - glutaminylnitro-D-arginyl-L-leucyl-L-leucyl-L-glutaminyl - L - leucyl - L-valinamide trifluoro acetate Concentrated hydrochloric acid (0.9 ml.) is added to a solution of t-butyloxycarbonyl-L-glutamyl - L - leucyl-L-seryl-D-arginyl-L-leucine hydrazide (1.35 g., 1.8 mmol. prepared by hydrogenolysis of the protected hydrazide) in dimethylformamide (13.5 ml.) cooled in a Dry-Ice-acetone bath at —20°. The temperature of the bath is allowed to rise to —15°, and an aqueous 14% solution of sodium nitrite (1.35 ml., 2.7 mmol.) is added. After 5 minutes, the bath temperature is lowered to —25° and N-ethylpiperidine is added (1.25 ml.). To this mixture containing the t-butyloxycarbonyl pentapeptide azide, a solution of nitro-D-arginyl-β-benzyl-L-aspartyl-O-benzyl-L-seryl-L-alanyl nitro-D-arginyl-L-leucyl - L - glutaminyl-nitro-D-arginyl-L-leucyl-L-leucyl - L - glutaminylglycyl-L-leucyl-L-valinamide trifluoroacetate (2.8 g., 1.4 mmol.) in dimethylformamide (13.5 ml.) is added. The reaction mixture is stored at 5° and after 48 hours another portion of t-butyloxycarbonyl pentapeptide azide (prepared from 150 mg. of the corresponding hydrazide) is added. After a total of 4 days, the solvents are removed in vacuo, and the residue is disintegrated with ethyl acetate. The solid is collected by filtration and dried. The material thus obtained is dissolved in cold trifluoroacetic acid (30 ml.) and the solution kept at room temperature for 15 minutes. The trifluoroacetic acid is removed in vacuo and the residue is disintegrated with ether, filtered, and dried. This trifluoroacetate is washed twice with water (30 ml.) to remove salts and excess pentapeptide. The insoluble material is collected by centrifugation and dried in vacuo (KOH), yield: 2.9 g. (80%).

EXAMPLE 9

L-glutamyl - L - leucyl-L-seryl-D-arginyl - L - leucyl-D-arginyl-L-aspartyl-L-seryl - L - alanyl - D - arginyl-L-leucyl - L - glutaminyl-D-arginyl - L - leucyl-L-leucyl-L-gluaminylglycyl-L-leucyl-L-valinamide A solution of the partially protected nonadecapeptide amide (1.4 g.) in aqueous (80%) acetic acid (50 ml.) is hydrogenated over 10% palladium on charcoal for 48 hours, the catalyst is removed by filtration, and the filtrate is freeze-dried, yield: 1.25 g.

EXAMPE 10

L-threonyl - L - phenylalanyl - L - threonyl-L-seryl-L-glutamyl - L - leucyl-L-seryl-D-arginyl-L-leucyl-D-arginyl-L-aspartyl - L - seryl-L-alanyl-D-arginyl - L - leucyl-L-glutaminyl - D - arginyl - L - leucyl - L - leucyl-L-glutaminylglycyl-L-leucyl-L-valinamide Aqueous 14% sodium nitrite (0.45 ml., 0.9 mmol.) is added to a solution of benzyloxycarbonyl-L-threonyl-L-phenylalanyl-L-threonyl-L-serine hydrazide (450 mg., 0.75 mmol.) in dimethylformamide (5.6 ml.) containing concentrated hydrochloric acid (0.37 ml.) cooled in a Dry Ice-acetone bath at —15°. After 15 minutes the temperature of the bath is lowered to —25°, and N-ethylpiperidine (0.53 ml.) added. To this mixture containing the benzyloxycarbonyl tetrapeptide azide, a solution of the free nonadecapeptide amide (1.2 g., 0.5 mmol.) in dimethylformamide (3.3 ml.) and water (1 ml.) is added. The reaction mixture is stored at 5°. A second portion of benzyloxycarbonyl tetrapeptide azide (prepared from 90 mg. of the corresponding hydrazide) is added after 24 hours. After a total of 48 hours, the solvents are removed in vacuo, and the residue is dissolved in aqueous 90% acetic acid (70 ml.) and hydrogenated over 10% palladium on charcoal (500 mg.) for 7 hours. The catalyst is removed by filtration and the filtrate is freeze-dried. This lyophillizate is distributed for 250 transfers in the system: 1 - butanol - pyridine - acetic acid-water (4:2:1:7). Only one major peak is observed, yield: 740 mg.

EXAMPLE 11

D-histidyl-L-seryl-L-aspartylglycyl - L - threonyl-L-phenylalanyl-L-threonyl-L-seryl-L-glutamyl - L - leucyl-L-seryl - D-arginyl-L-leucyl-D-arginyl-L-aspartyl-L-seryl-L-alanyl-D-arginyl - L - leucyl-L-glutaminyl-D-arginyl-L-leucyl-L-leucyl - L -glutaminylglycyl - L - leucyl-L-valinamide Concentrated hydrochloric acid (0.09 ml.) is added to a stirred solution of t-butyloxycarbonyl-D-histidyl-L-seryl-L-aspartylglycine hydrazide (96 mg., 0.18 mmol. obtained from hydrogenolysis of the protected hydrazide) in dimethylformamide (1.5 ml.) cooled in a Dry Ice-acetone bath at —20°. The temperature of the bath is allowed to rise to —15°, and an aqueous 14% solution of sodium nitrite (0.15 ml., 0.3 mmol.) is added. After 5 minutes the temperature of the bath is lowered to —25°, and N-ethylpiperidine (0.13 ml.) is added. To this mixture, containing the t-butyloxycarbonyl tetrapeptide azide, a solution of the free tricosapeptide amide (168 mg., 0.06 mmol.) in dimethylformamide (2.1 ml.) is added. The reaction mixture is stored at 5°. A second portion of t-butyloxycarbonyl tetrapeptide azide (prepared from 32 mg. of the corresponding hydrazide) is added after 24 hours. After a total of 48 hours, the solvents are removed in vacuo, and the residue is dissolved in cold trifluoroacetic acid (6 ml.). The solution is kept at room temperature for 15 minutes, and the heptacosapeptide trifluoroacetate is precipitated with ether (100 ml.). The solid is collected by centrifugation, washed with ether and dried, yield: 330 mg. This material is distributed for 200 transfers in the system 1-butanol-0.1 M phosphate buffer pH 7(1:1). The desired heptacosapeptide amide is found in a separated peak and receovered from the two-phase system by the alginic acid adsorption procedure, yield: 62 mg.

EXAMPLE 12

Benzyloxycarbonyl - D - histidyl - O - benzyl-L-seryl-β-benzyl-L-asparatyl-glycyl - L -threonyl-L-phenylalanyl-L-threonyl-O-benzyl-L-seryl-γ-benzyl - L - glutamyl-L-leucyl - O - benzyl-L-seryl-nitro-L-arginyl - L - leucyl-nitro-L-arginyl-β-benzyl - L - aspartyl-O-benzyl-L-seryl-L-alanyl-nitro-L-arginyl - L - leucyl - L - glutaminyl-nitro-L-arginyl - L -leucyl-L-leucyl-L-glutaminylglycyl-L-leucyl-L-valinamide Sodium nitrite (70 mg., 1 mmol.) is added to a solution of benzyloxycarbonyl-D-histidine hydrazide (305 mg., 1 mmol.) in a mixture of ethyl acetate (4 ml.) and 1 N hydrochloric acid 3 ml., while stirring in an ice-salt bath. After 3 minutes an aqueous (50%) solution of potassium carbonate (0.8 ml.) is added, and after another 3 minutes the stirring is interrupted and the two phases are allowed to separate. The aqueous phase is extracted with a second portion of ethyl acetate (1 ml.) and discarded. The combined organic phases are pooled and dried at 0° with magnesium sulfate.

This ethyl acetate solution (3.5 ml.) of benzyloxycarbonyl-D-histidine azide is added to an ice-cold solution of the hexacosapeptide trifluoroacetate (780 mg.) in a mixture of dimethylformamide (6 ml.) and triethylamine (0.4 ml. of a 14% v./v. triethylamine-dimethylformamide solution). The reaction mixture is kept at 5°. After 24 hours another portion of benzyloxycarbonyl-D-histidine azide (⅓ the initial amount) is added. Twenty-four hours after this addition, the reaction mixture is added dropwise to ethyl acetate (500 ml.). The solid material is filtered, washed with ethyl acetate, and dried in vacuo over sodium hydroxide. Yield: 717 mg., M.P. softens, 135°, darkens 225°, decomposes, 310° $[\alpha]_D^{25}$ —10.8 (concentration 1% acetic acid).

EXAMPLE 13

$N^\alpha$-benzyloxycarbonyl-nitro - D - arginyl - L - leucyl-L-leucyl-L-glutaminylglycyl-L-leucyl-L-valinamide A solution of $N^\alpha$-benzyloxycarbonyl-nitro-D-arginine (3.53 g.) and of 2,4-dinitrophenol (2.0 g.) in tetrahydrofuran (60 ml.) is cooled with ice water during the addition of dicyclohexylcarbodiimide (2.1 g.). After about 1 hour at room temperature, the precipitate (dicyclohexylurea) is filtered off and is washed with tetrahydrofuran (40 ml.). The combined filtrate and washings are evaporated to dryness in vacuo, the residue is dissolved in ethyl acetate (ca. 10 ml.) and precipitated with ether (ca. 50 ml.). The ester is washed with ether (ca. 50 ml.) and dried in vacuo.

The hexapeptide amide (3.9 g.) is dissolved in hot (ca. 80°) dimethylformamide (150 ml.) and is mixed with a solution of the above active ester in the same solvent (50 ml.). The mixture is cooled to room temperature and after about 4 hours it is diluted with ether (1 l.). The precipitate is filtered, washed with ether (0.6 l.) and ethyl acetate (0.3 l.) and dried in air, yield: 4.5 g.

EXAMPLE 14

Benzyloxycarbonyl - L - glutaminyl-nitro - D - arginyl-L-leucyl-L-leucyl - L - glutaminylglycyl-L-leucyl-L-valinamide The protected heptapeptide (9.8 g.) is dissolved in warm acetic acid (50 ml.), cooled, and treated with hydrobromic acid in acetic acid (ca. 4 N, 50 ml.). After 1 hour at room temperature, ether (1.2 l.) is added to the solution, the hydrobromide is filtered, washed with ether, and dried in vacuo over sodium hydroxide for a short time. It is then dissolved in dimethylformamide (100 ml.), and is made alkaline with triethylamine (10.4 ml.). Benzyloxycarbonyl-L-glutamic p-nitrophenyl ester (5.0 g.) is added to the mixture which is left at room temperature overnight; crystals separate, forming a semisolid mass. The mixture is diluted with ethyl acetate (1 l.), the precipitate is filtered, washed with ethyl acetate (500 ml.), ethanol (500 ml.), and with ethyl acetate, hot ethyl acetate (250 ml.), and hot chloroform (250 ml.). The product is dried first on air and then at 50° in vacuo, weight 11.0 g. (100%).

EXAMPLE 15

Benzyloxycarbonyl - L - leucyl - L - glutaminyl-nitro-D-arginyl - L - leucyl - L - leucyl-L-glutaminylglycyl-L-leucyl-L-valinamide The protected octapeptide (11.1 g.) is powdered and added with stirring to acetic acid (50 ml.). Hydrobromic acid in acetic acid (ca. 4 N, 50 ml.) is slowly added to the suspension. Stirring is continued until all the material dissolves and then for 30 minutes more; a total of 3 hours is required. The amine hydrobromide is precipitated with ether (1 l.), filtered, washed with ether, and dried in vacuo over sodium hydroxide for a short time. The hydrobromide is dissolved in dimethylformamide (100 ml.) and triethylamine (10.4 ml.) is added to the cooled solution, followed by the benzyloxycarbonyl-L-leucine p-nitrophenyl ester (5.0 g.). After standing overnight at room temperature, the mixture is diluted with ethyl acetate (2 l.). The precipitate which formed is filtered and washed with 200 ml. portions of ethyl acetate, chloroform, hot chloroform, and hot ethyl acetate. The product is dried in vacuo at 50° weight 12.1 g. (99%).

EXAMPLE 16

$N^\alpha$-benzyloxycarbonyl-nitro - D - arginyl - L - leucyl-L-glutaminyl-nitro - D - arginyl-L-leucyl - L - leucyl-L-glutaminylglycyl-L-leucyl-L-valinamide The protected nonapeptide amide (24.2 g.) is suspended in acetic acid (100 ml.) and hydrobromic acid in acetic acid (ca. 4 N, 100 ml.) is slowly added to the suspension A homogeneous solution is obtained in about 1 hour, and the solution is kept at room temperature for an additional hour. Ether (2 l.) is added to the solution. The precipitated hydrobromide is filtered, washed with ether, and dried in vacuo over sodium hydroxide for a short time. It is dissolved in dimethylformamide (250 ml.); the solution is cooled while being made alkaline with triethylamine (14 ml.). Benzyloxycarbonyl-nitro-D-arginine 2,4-dinitrophenyl ester (25.8 g.) is added followed by more triethylamine (5 ml.). After 3 hours at room temperature, the solution gives no reaction with ninhydrin. The next day it is diluted with ethyl acetate (2 l.), the precipitate is collected and washed with ethyl acetate (500 ml.), chloroform (500 ml.), hot chloroform (1.5 l.), and hot ethyl acetate (500 ml.). The product is dried at 50° in vacuo (25.1 g. 88%).

EXAMPLE 17

Benzyloxycarbonyl - L - alanyl-nitro - D - arginyl-L-leucyl - L - glutaminyl-nitro - D - arginyl-L-leucyl-L-leucyl-L-glutaminylglycyl-L-leucyl-L-valinamide To a solution of the protected decapeptide amide (25.5 g.) in acetic acid (120 ml.), a solution of hydrobromic acid in acetic acid (ca. 4 N, 120 ml.) is slowly added. After 1.5 hour at room temperature the hydrobromide is precipitated with ether (ca. 2 l.) washed with ether, and dried briefly in vacuo over sodium hydroxide. It is dissolved in dimethylformamide (180 ml.); triethylamine (18 ml.) is added to the solution followed by benzyloxycarbonyl-L-alanine p-nitrophenyl ester (9.3 g.). The reaction is allowed to proceed overnight, then the mixture is filtered, the triethylammonium bromide washed with dimethylformamide (50 ml.), more active ester (3.1 g.) and triethylamine (1 ml.) were added and the solution is concentrated to a small volume. After 2 hours it is diluted with chloroform (2 l.). The crystalline precipitate is washed with chloroform and dried in air. The dry product (25.6 g. 95%).

EXAMPLE 18

N - t - butyloxycarbonyl - O - benzyl-L-seryl-L-alanyl-nitro - D - arginyl - L - leucyl-L-glutaminyl-nitro-D-arginyl - L - leucyl - L - leucyl - L - glutaminyl-glycyl-L-leucyl-L-valinamide To a suspension of the protected hendecapeptide (24.0 g.) in acetic acid (160 ml.), a 4 N solution of hydrobromic acid in acetic acid (160 ml.) is slowly added. After about 2 hours at room temperature, the solution is diluted with ether (2 l.) and the precipitate filtered, washed with ether, and dried in vacuo over sodium hydroxide. The hydrobromide is dissolved in methanol (235 ml.); the solution is cooled in an ice-water bath and neutralized with triethylamine (25 ml.). A thick mass of crystals appears. The suspension is diluted with chloroform (500 ml.); the crystals are filtered, washed with chloroform (1 l.), and dried in air and finally in vacuo at 40°. The monohydrobromide (18.4 g. 80%).

The monohydrobromide (18.0 g.) in dimethylformamide (800 ml.) is treated in the presence of triethylamine (1.5 ml.) with N-t-butyloxycarbonyl-O-benzyl-L-serine p-nitrophenyl ester. This active ester is prepared from the corresponding acid (9.4 g.), p-nitrophenol (5.5 g.) and dicyclohexylcarbodiimide (6.6 g.) in ethyl acetate (40 ml.). The N,N'-dicyclohexylurea is filtered off and the solvent removed from the filtrate in vacuo. The oily residue, which failed to crystallize, is used without purification. After 1 day at room temperature, the mixture is concentrated in vacuo to about 50 ml. Ethyl acetate (1.5 l.) is added and the precipitate filtered and washed with ethyl acetate (500 ml.), chloroform (200 ml.), and once more with ethyl acetate (500 ml.). During the treatment with chloroform the material turns into a crystalline mass. The protected dodecapeptide is dried at 40° in vacuo, weight 19.1 g. (93%).

EXAMPLE 19 t-Butyloxycarbonyl-β-benzyl-L-aspartyl - O - benzyl - L-seryl-L-alanyl-nitro-D-arginyl-L-leucyl-L - glutaminyl-nitro-D-arginyl-L-leucyl - L - leucyl - L - glutaminyl-glycyl-L-leucyl-L-valinamide The protected dodecapeptide amide (18.8 g.) is dissolved in trifluoroacetic acid (120 ml.). After about 15 minutes, most of the trifluoroacetic acid is evaporated in vacuo and the syrupy residue diluted with ether (500 ml.). The precipitate is collected, washed with ether, and dried in vacuo over sodium hydroxide. The free amine, trifluoroacetate (19.0 g.) has no well-defined melting point. This material (12.35 g.) is dissolved in dimethylformamide (500 ml.); triethylamine (0.70 ml.) and t-butyloxycarbonyl-β-benzyl-L-aspartic acid p-nitrophenyl ester (3.35 g.) are added to the solution, and 2 hours later a second portion (3.35 g.) of the active ester and triethylamine (0.35 ml.) is added. The mixture is allowed to stand overnight at room temperature. After the addition of more active ester (3.35 g.) and triethylamine (0.35 ml.), the mixture is concentrated in vacuo to about 100 ml. A final portion of the active ester (3.35 g.) and triethylamine (0.14 ml.) are added, and the mixture is left at room temperature overnight. Most of the solvent is removed in vacuo and the residue diluted with ethyl acetate (160 ml.). The protected tridecapeptide is filtered, washed with ethyl acetate, and dried in air; then in vacuo at 40°. The product (13.05 g., 94%).

EXAMPLE 20

N$^\alpha$-t-butyloxycarbonyl-nitro-D - arginyl - β - benzyl - L-aspartyl-O-benzyl-L-seryl-L-alanyl-nitro - D - arginyl-L-leucyl-L-glutaminyl-nitro-D-arginyl - L - leucyl-L-leucyl-L-glutaminylglycyl-L-leucyl-L-valinamide The protected tridecapeptide of Ex. 19 (13.0 g.) is dissolved in trifluoroacetic acid (100 ml.). After about 15 min. at room temperature, most of the trifluoroacetic acid is removed in vacuo, and the residue is triturated with ether (900 ml.). The free amine-trifluoroacetate is filtered, washed with ether, and dried in vacuo over sodium hydroxide (13.3 g.). To a solution of the trifluoroacetate in dimethylformamide (145 ml.), t - butyloxycarbonyl-nitro-D-arginine 2,4-dinitrophenyl ester (6.0 g.) is added followed by triethylamine (1.0 ml.). In the following 7 hours more triethylamine (a total of 1.1 ml.) is added in several portions to maintain the slight alkalinity of the mixture. After about 24 hours at room temperature more active ester (2.0 g.) and triethylamine (0.7 ml.) are added, and after an additional day most of the solvent is removed in vacuo. The residue is triturated with ethyl acetate (about 1 l.) and the solid material filtered and washed with ethyl acetate and ether. After drying in air and in vacuo at 40°, the crude protected tetradecapeptide weighs 13.75 g.

EXAMPLE 21

N$^\alpha$-t-butyloxycarbonyl-nitro-D - arginyl - β - benzyl - L-aspartyl-O-benzyl-L-seryl-L-alanyl-nitro - L - arginyl-L-leucyl-L-glutaminyl-nitro-L-arginyl - L - leucyl - L-leucyl-L-glutaminylglycyl-L-leucyl-L-valinamide The protected L-tridecapeptide of sequence 15–27 (13.0 g.) is dissolved in trifluoroacetic acid (100 ml.). After about 15 min. at room temperature, most of the trifluoroacetic acid is removed in vacuo, and the residue is triturated with ether (900 ml.). The free amine-trifluoroacetate is filtered, washed with ether, and dried in vacuo over sodium hydroxide (13.3 g.). To a solution of the trifluoroacetate in dimethylformamide (145 ml.), t-butyloxy-carbonyl-nitro-D - arginine 2,4 - dinitrophenyl ester (6.0 g.) is added followed by triethylamine (1.0 ml.). In the following 7 hours, more triethylamine (a total of 1.1 ml.) is added in several portions to maintain the slight alkalinity of the mixture. After about 24 hours at room temperature, more active ester (2.0 g.) and triethylamine (0.7 ml.) are added, and after an additional solution of the trifluoroacetate in dimethylformamide (145 ml.), t-butyloxycarbonyl-nitro-D-arginine 2, 4-dinitrophenyl ester (6.0 g.) is added followed by triethylamine (1.0 ml.). In the following 7 hours more triethylamine (a total of 1.1 ml.) is added in several portions to maintain the slight alkalinity of the mixture. After about 24 hours at room temperature more active ester (2.0 g.) and triethylamine (0.7 ml.) are added, and after an additional day most of the solvent is removed in vacuo. The residue is triturated with ethyl acetate about (1 l.) and the solid material filtered and washed with ethyl acetate and ether. After drying in air and in vacuo at 40°, the crude protected tetradecapeptide weighs 13.75 g.

EXAMPLE 22

D-arginyl-L-aspartyl-L-seryl-L - alanyl - D - arginyl - L-leucyl-L-glutaminyl-D-arginyl-L-leucyl - L - leucyl-L-glutaminylglycyl-L-leucyl-L-valinamide The protected tetradecapeptide of Example 20 (13.7 g.) is dissolved in trifluoroacetic acid (105 ml.). After standing about 15 min. at room temperature, the solvent is concentrated in vacuo, and the residue triturated with ether (1 l.). The free amine trifluoroacetate is collected by filtration, washed with ether, and dried in vacuo over sodium hydroxide (13.9 g.).

The free amine trifluoroacetate (13.9 g.) is dissolved in acetic acid (80%, 150 ml.). Palladium on charcoal (10%, 1.5 g.) is added and hydrogen is passed into the system for 48 hours. The catalyst is removed by filtration and the filtrate freeze-dried, weight=12.2 g.

EXAMPLE 23

D - histidyl - L - seryl - L - aspartylglycyl - L - threonyl-L - phenylalanyl - L - threonyl - L - seryl - L-glutamyl - L - leucyl - L - seryl - L - arginyl - L - leucyl-L - arginyl - L - aspartyl - L - seryl - L - alanyl - L-arginyl - L - leucyl - L - glutaminyl - L - arginyl - L-leucyl - L - leucyl - L - glutaminylglycyl - L - leucyl - L-valinamide The protected heptacosapeptide, benzyloxycarbonyl-D-histidyl - O - benzyl - L - seryl - β - benzyl - L - aspartyl-glycyl - L - threonyl - L - phenylalanyl - L - threonyl - O-benzyl - L - seryl - γ - benzyl - L - glutamyl - L - leucyl-O - benzyl - L - seryl - nitro - L - arginyl - L - luecyl-nitro - L - arginyl - β - benzyl - L - aspartyl - O - benzyl-L - seryl - L - alanyl - nitro - L - arginyl - L - leucyl - L-glutaminylnitro - L - arginyl  L - leucyl - L - leucyl - L-glutaminylglycyl-L-luecyl-L-valinamide, (500 mg.) is dissolved in acetic acid (80%, 50 ml.). Palladium on barium sulfate (5%, 400 mg.) is added and the mixture hydrogenated for 48 hours. The catalyst is removed by centrifugation at 1500 r.p.m. and the supernatant freeze-dried, weight=444 mg. Distribution constant in the systems n-butanol-phosphate buffer pH 7 K=0.62. Amino acid analysis after acid hydrolysis (molar ratios): aspartic acid (1.91); threonine (1.80); serine (3.4); glutamic acid (2.94); glycine (2.06); alanine (1.02); valine (1.14); leucine (6.2); phenylalanine (1.0); histidine (0.91); arginine (3.97).

EXAMPLE 24 t-Butyloxycarbonyl-O-benzyl-D-seryl-L-aspartylglycine benzyloxycarbonylhydrazide t-Butyloxycarbonyl-β-t-butyl - L - aspartylglycine benzyloxycarbonylhydrazide (10.8 g.) is dissolved in ice-cold trifluoroacetic acid (50 ml.), and the solution is kept at room temperature for one hour. The trifluoroacetic acid is removed in vacuo at room temperature and the residue is triturated under ether. The solid is filtered, washed with ether, and dried in vacuo (KOH), Yield: 7.1 g. (16 mmol.). This trifluoroacetate is dissolved in ice-cold dimethylformamide, neutralized with triethylamine (4.62 ml., 33 mmol.) and allowed to react with t-butyloxycarbonyl-O-benzyl-D-serine p-nitrophenyl ester [prepared from 7.1 g. (24 mmol.) of t-butyloxycarbonyl-O-benzyl-D-serine]. The reaction mixture is kept at room temperature for 2 hours, diluted with ethyl acetate (400 ml.), and extracted once with 20% citric acid and three times with water. The organic layer is dried (MgSO$_4$), and the solvent is removed in vacuo. The residue is crystallized from ethyl acetate. Yield: 7.7 g. (80%).

EXAMPLE 25 t-Butyloxycarbonyl-D-histidyl-O-benzyl-D-seryl-L-aspartylglycine benzyloxycarbonylhydrazide Sodium nitrite (840 mg., 12 mmol.) is added to a solution of t-butyloxycarbonyl-D-histidine hydrazide (3.22 g., 12 mmol.) in a mixture of ethyl acetate (48 ml.) and 1 N hydrochloric acid (36 ml.), while stirring in an ice-salt bath. After 3 minutes an aqueous (50%) solution of potassium carbonate (9.6 ml.) is added, and after another 3 minutes the stirring is interrupted and the two phases are allowed to separate. The aqueous phase is extracted with a second portion of ethyl acetate (12 ml.) and discarded. The combined organic phases are pooled and dried at 0° with magnesium sulfate.

This ethyl acetate solution of t-butyloxycarbonyl-D-histidine azide is added to an ice-cold solution of O-benzyl-D-seryl - L - aspartylglycine benzyloxycarbonylhydrazide trifluoroacetate [prepared from 5.0 g. of the t-butyloxycarbonyl protected tripeptide with removal of t-butyloxycarbonyl group with trifluoroacetic acid (8 mmol.)] in a mixture of dimethylformamide (24 ml.) and triethylamine (2.24 ml.). The reaction mixture is kept at 5°. After 24 hours another portion of t-butyloxycarbonyl-D-histidine azide (prepared from 1.07 g. of the corresponding hydrazide) is added. Twenty-four hours after this addition, the reaction mixture is concentrated to dryness in vacuo and the residue is crystallized twice from 50% aqueous ethanol, yield: 4.4 g. (70%).

EXAMPLE 26

1-D-His-2-D-Ser secretin

Concentrated hydrochloric acid (0.09 ml.) is added to a stirred solution of tert.-butyloxycarbonyl-D-His-D-Ser-L-Asp-Gly-NHNH$_2$ (96 mg., 0.18 mmol, obtained by hydrogenolysis of the protected tetrapeptide hydrazide of Example 25) in dimethylformamide (1.5 ml.) cooled in a Dry Ice-acetone bath at —20° C. The temperature of the bath is allowed to rise to —15° C., and an aqueous 15% solution of sodium nitrite (0.15 ml., 0.3 mmol) is added. After 5 minutes the temperature of the bath is lowered to —25° C., and N-ethylpiperidine (0.13 ml.) added. To this mixture, containing the tert.-butyloxycarbonyl tetrapeptide azide, there is added a solution of the free tricosapeptide, L - Thr - L - Phe - L - Thr - L - Ser-L - Glu - L - Leu - L - Ser - L - Arg - L - Leu - L - Arg-L - Asp - L - Ser - L - Ala - L - Arg - L - Leu - L - Gln-L - Arg - L - Leu - L - Leu - L - Gln - Gly - L - Leu-L - Val acetate (168 mg.), in dimethylformamide (2.1 ml.). The reaction mixture is stored at 5° C.

A second portion of t-butyloxycarbonyl tetrapeptide-azide (prepared from 90 mg. of the corresponding hydrazide) is added after 24 hours. After a total of 48 hours, the solvents are removed in vacuo, and the residue is dissolved in cold trifluoroacetic acid (10 ml.). The solution is kept at room temperature for 15 minutes, and the heptacosapeptide trifluoroacetate is precipitated with ether. The solid is collected by centrifugation, washed with ether and dried. This material is distributed for 250 transfers in the system: 1-butanol-pyridine-acetic acid-water (4:2:1:7). Only one major peak is observed, yield: 74 mg.

EXAMPLE 27

1-D-His-6-D-Phe secretin

The title compound is prepared by coupling according to the procedure of Example 10 the tetrapeptide of Example 3 to the nonadecapeptide prepared as described in Example 9 but wherein all arginyl residues have the L-configuration, and coupling the resulting tricosapeptide to the tetrapeptide tert.-butyloxycarbonyl-D-His-L-Ser-L-Asp-Gly hydrazide according to the procedure of Example 11.

EXAMPLE 28

1-D-His-12-D-Arg secretin

The protected tetradecapeptide $N^\alpha$-t-butyloxycarbonyl-nitro - L - Asp - $\beta$ - benzyl - L - Asp - O - benzyl - L-Ser - L - Ala - nitro - L - Arg - L - Leu - L - Gln - nitro-L - Arg - L - Leu - L - Leu - L - Gln - Gly - L - Leu - L-Val - NH$_2$ (0.92 g.) is dissolved in trifluoroacetic acid (18 ml.). After about 15 minutes at room temperature, most of the trifluoroacetic acid is removed in vacuo and the residue is triturated with ether (100 ml.). The free amine-trifluoroacetate is filtered, washed with ether and dried in vacuo over sodium hydroxide. Paper chromatographic examination of this material in the system of butanol-acetic acid-water (4:1:5) reveals a single (ninhydrin yellow) component at R$_f$=0.78.

The free tetradecapeptide is coupled to the pentapeptide, tert.-butyloxycarbonyl - $\gamma$ - benzyl-L-Glu-L-Leu-O-benzyl-L - Ser - nitro-D-Arg-L-Leu-benzyloxycarbonyl hydrazide following the procedure of Example 8 to yield the nonadecapeptide of amino acid sequence 9–27.

The nonadecapeptide is then deprotected and coupled to the tetrapeptide benzyloxycarbonyl-L-Thr-L-Phe-L-Thr-L-Ser hydrazide following the procedure of Example 10 to yield the tricosapeptide of amino acid sequence 5–27.

The foregoing tricosapeptide is then deprotected and coupled to the tetrapeptide tert.-butyloxycarbonyl-D-His-L-Ser-L-Asp-Gly-NHNH$_2$ following the procedure of Example 11 to yield the title compound.

EXAMPLE 29

1-D-His-14-D-Arg secretin

The protected tridecapeptide, tert.-butyloxycarbonyl-$\beta$-benzyl - L - Asp-O-benzyl-L-Ser-L-Ala-nitro-L-Arg-L-Leu-L-Glu - nitro - L - Arg-L-Leu-Leu-L-Gln-Gly-L-Leu-L-Val-NH$_2$, prepared as described in U.S. Pat. 3,417,072 (13.0 g.) is dissolved in trifluoroacetic acid (100 ml.). After about 15 minutes at room temperature, most of the trifluoroacetic acid is removed in vacuo, and the residue is triturated with ether (900 ml.). The free amine-trifluoroacetate is filtered, washed with ether, and dried in vacuo over sodium hydroxide (13.3 g.). To a solution of the trifluoroacetate in dimethylformamide (145 ml.), t-butyloxycarbonyl-nitro-D-arginine 2,4-dinitrophenyl ester (6.0 g.) is added followed by triethylamine (1.0 ml.). In the following 7 hours more triethylamine (a total of 1.1 ml.) is added in several portions to maintain the slight alkalinity of the mixture. After about 24 hours at room temperature, more active ester (2.0 g.) and triethylamine (0.7 ml.) are added, and after an additional day most of the solvent is removed in vacuo. The residue is triturated with ethyl acetate (about 1 l.) and the solid material filtered and washed with ethyl acetate and ether. After drying in air and in vacuo at 40°, the crude protected tetradecapeptide weighs 13.75 g.

The protected tetradecapeptide (13.7 g.) prepared as described in the foregoing paragraph is dissolved in trifluoroacetic acid (105 ml.). After standing about 15 minutes at room temperature, the solvent is concentrated in vacuo, and the residue triturated with ether (1 l.). The free amine trifluoroacetate is collected by filtration, washed with ether, and dried in vacuo over sodium hydroxide (13.9 g.).

The free amine trifluoroacetate (13.9 g.) is dissolved in acetic acid (80%, 150 ml.). Palladium on charcoal (10%, 1.5 g.) is added and hydrogen is passed into the system for 48 hours. The catalyst is removed by filtration and the filtrate freeze-dried, weight=12.2 g.

The free tetradecapeptide is then coupled with the pentapeptide BOC - L-Glu-L-Leu-L-Ser-L-Arg-L-Leu-$NHNH_2$ following the procedure described by Ondetti et al., J.A.C.S., 90, 4711–4715.

The resulting nonapeptide is then coupled with the tetrapeptide Z-L-Thr-L-Phe-L-Thr-L-Ser-$NHNH_2$ following the procedure described by Ondetti et al., supra, and the resulting tricosapeptide coupled to the tetrapeptide tert.-butyloxycarbonyl - D - His-L-Ser-L-Asp-Gly-$NHNH_2$ according to the procedure of Example 11, to yield the title compound.

EXAMPLE 30

1-D-His-21-D-Arg secretin

The title compound is prepared following the procedure of U.S. Pat. 3,417,072, but substituting $N^\alpha$-benzyloxycarbonyl-nitro-D-arginine for $N^\alpha$-benzyloxycarbonylnitro-L-arginine in Example 11 of the patent, and substituting bis-benzyloxycarbonyl-D-histidine p-nitrophenyl ester for bis-benzyloxycarbonyl-L-histidine p-nitrophenyl ester in Example 31 of the patent.

EXAMPLE 31

1-D-His-18-D-Arg secretin

The title compound is prepared following the procedure of U.S. Pat. 3,417,072, but substituting benzyloxycarbonyl-nitro-D-arginine 2,4-dinitrophenyl ester for benzyloxycarbonyl-nitro-L-arginine 2,4-dinitrophenyl ester in Example 14 of the patent, and substituting bis-benzyloxycarbonyl-D-histidine p-nitrophenyl ester for bis-benzyloxycarbonyl-L-histidine p-nitrophenyl ester in Example 31 of the patent.

EXAMPLE 32

1-D-His-14,18,21-tri D-Arg secretin

The title compound is prepared following the procedure of Examples 4–11 except that in Example 4, tert.-butyloxycarbonylnitro-L-arginine 2,4-dinitrophenyl ester is substituted for tert.-butyloxycarbonyl-D-arginine 2,4-dinitrophenyl ester.

EXAMPLE 33

Treatment of 1-D-His secretin with dipeptidyl aminopeptidase I from rat liver 1-D-histidine secretin (2.5 mg.) and dipeptidyl aminopeptidase from rat liver (125 μg.) are dissolved in 5 ml. of pH 5 buffer solution (15 mM. HCl—0.3% pyridine—10mM. 2-mercaptoethanol) and the solution incubated at 37° C. for four hours. Paper chromatography of the reaction mixture in the system 1-butanol-formic acid-water (70:15:15) shows only the undegraded starting material. Under the same conditions secretin is extensively degraded and up to 10 dipeptides spots are detected on the paper chromatogram.

EXAMPLE 34

Treatment of 1-D-His-12,14,18,21-tetra D-Arg secretin with tryspin

1-D-His-12,14,18,21-tetra-D-Arg secretin (2 mg.) is dissolved in water (0.5 ml.) and the solution diluted with 2% aqueous ammonium bicarbonate (0.5 ml.). Trypsin solution (0.02 ml.) is added at 0 h., 2 h., and 4 h. The reaction mixture is incubated at room temperature for 6 hours, and then freeze-dried. Paper chromatography of this mixture with the system 1-butanol-pyridine-acetic acid-water (30:20:6:24) shows only the undegraded starting material. Under the same conditions secretin is completely degraded to a mixture of five peptides.

EXAMPLE 35

Three dogs are injected with 0.2 units/kg. synthetic secretin and another three dogs are injected wtih 0.05 μg./kg. of partially purified 1-D-His secretin. The volume of pancreatic output and the bicarbonate content are shown in the following table:

|  | Secretin | 1-D-histidine secretin |
|---|---|---|
| Volume | 16.77 ml./15 minutes | 5.87 ml./15 minutes |
| Bicarbonate content | 1.89 meq./15 minutes | 0.40 meq./15 minutes |

The procedure of the foregoing paragraph is repeated except that the dosage of secretin is increased to 0.6 units/kg. and that of the partially purified 1-D-His secretin is increased to 0.15 mg./kg. The results in output and bicarbonate content are shown in the following table:

|  | Secretin | 1-D-histidine secretin |
|---|---|---|
| Volume | 21.67 ml./15 minutes | 7.93 ml./15 minutes |
| Bicarbonate content | 2.63 meq./15 minutes | 0.64 meq./15 minutes |

The foregoing data show that the 1-D-histidine analog of secretin has substantial secretin-like activity even though the analog is only partially purified.

EXAMPLES 36–41

Following the procedures of U.S. Pat. 3,417,072, but substituting the D-amino acid residues indicated below for the corresponding L-amino acid residues, the following compounds are prepared:

Example—
36: 1-D-His-2-Ser-6-D-secretin
37: 1-D-His-12,14-bis-D-Arg secretin
38: 1-D-His-6-D-Phe-18-D-Arg secretin
39: 1-D-His-2-D-Ser-12-D-Arg secretin
40: 1-D-His-2-D-Ser-14,18-bis-D-Arg secretin
41: 1-D-His-2-D-Ser-21-D-Arg secretin

EXAMPLE 42

Following the procedure of Example 33 but substituting the D-secretin analogs of Examples 11, 26–32, and 36–41, the foregoing secretin analogs are found to be undegraded after treatment for four hours with dipeptidyl aminopeptidase.

EXAMPLE 43

Following the procedure of Example 35 but substituting the D-secretin analogs of Examples 11, 26–32 and 36–41, substantially similar results are obtained.

What is claimed is:

1. A peptide having the formula: D-His-R-Ser-L-Asp-Gly-L-Thr-R-Phe-L-Thr-L-Ser-L-Glu-L-Leu-L - Ser - R-Arg-L-Leu-R-Arg-L-Asp-L-Ser-L-Ala-R-Arg-L - Leu - L-Glu($NH_2$)-R-Arg-L-Leu-L-Leu-L-Glu($NH_2$)-Gly-L - Leu-L-Val-$NH_2$ and pharmaceutically acceptable salts thereof, wherein R is D or L.

2. An intermediate for a compound of the formula
D-His-R-Ser-L-Asp-Gly-L-Thr-R-Phe-L-Thr-L-Ser - L-Glu-L-Leu-L-Ser-R-Arg-L-Leu-R-Arg-L-Asp-L - Ser-L-Ala-R-Arg-L-Leu-L-Glu($NH_2$)-R-Arg-L - Leu - L-Leu-L-Glu($NH_2$)-Gly-L-Leu-L-Val-$NH_2$
wherein R is D or L
the intermediate having the formula
N-protected-D-His-L-Ser-L-Asp-Gly-$NHNH_2$,
N-protected-D-His-D-Ser-L-Asp-Gly-$NHNH_2$,
N-protected-L-Thr-D-Phe-L-Thr-L-Ser-$NHNH_2$,
N-protected-L-Glu-L-Leu-L-Ser-D-Arg-L-Leu-$NHNH_2$, L-Glu-L-Leu-L-Ser-L-Arg-L-Leu-D-Arg-L-Asp-L-Ser-L-Ala-D-Arg-L-Leu-L-Gln-D-Arg-L-Leu-L-Leu-L-Gln-Gly-L-Leu-L-Val-NH$_2$, L-Glu-L-Leu-L-Ser-D-Arg-L-Leu-D-Arg-L-Asp-L-Ser-L-Ala-D-Arg-L-Leu-L-Gln-D-Arg-L-Leu-L-Leu-L-Gln-Gly-L-Leu-L-Val-NH$_2$, L-Thr-L-Phe-L-Thr-L-Ser-L-Glu-L-Leu-L-Ser-L-Arg-L-Leu-D-Arg-L-Asp-L-Ser-L-Ala-D-Arg-L-Leu-L-Gln-D-Arg-L-Leu-L-Leu-L-Gln-Gly-L-Leu-L-Val-NH$_2$, L-Thr-L-Phe-L-Thr-L-Ser-L-Glu-L-Leu-L-Ser-D-Arg-L-Leu-D-Arg-L-Asp-L-Ala-D-Arg-L-Leu-L-Gln-D-Arg-L-Leu-L-Leu-L-Gln-Gly-L-Leu-L-Val-NH$_2$, or N-protected-D-His-R-Ser-L-Asp-Gly-L-Thr-R-Phe-L-Thr-L-Ser-L-Glu-L-Leu-L-Ser-R-Arg-L-Leu-R-Arg-L-Asp-L-Ser-L-Ala-R-Arg-L-Leu-L-Glu(NH$_2$)-R-Arg-L-Leu-L-Leu-L-Glu(NH$_2$)-Gly-L-Leu-L-Val-NH$_2$.

References Cited

UNITED STATES PATENTS

| | | | |
|---|---|---|---|
| 3,417,072 | 12/1968 | Bodanszky | 260—112.5 |
| 3,400,118 | 9/1968 | Bodanszky et al. | 260—112.5 |

OTHER REFERENCES

Bodanszky et al., J. Am. Chem. Soc., *89*, 685 (1967).

Ondetti et al., J. Am. Chem. Soc., *90*, 4711 (1968).

ELBERT L. ROBERTS, Primary Examiner

R. J. SUYAT, Assistant Examiner

UNITED STATES PATENT OFFICE
CERTIFICATE OF CORRECTION

Patent No. 3,812,091            Dated May 21, 1974

Inventor(s) Miguel A. Ondetti

It is certified that error appears in the above-identified patent and that said Letters Patent are hereby corrected as shown below:

Column 10, line 52, "luecyl" should read --leucyl--.

Column 14, example 36 should read --1-D-His-2-D-Ser-6-D-Phe-secretin--.

Column 15, line 12, after "Asp" insert --L-Ser- --.

Signed and sealed this 1st day of October 1974.

(SEAL)
Attest:

McCOY M. GIBSON JR.            C. MARSHALL DANN
Attesting Officer            Commissioner of Patents